United States Patent [19]

Voltmer et al.

[11] E Patent Number: Re. 33,579

[45] Reissued Date of Patent: Apr. 30, 1991

[54] LITERATURE APPLYING MECHANISM

[75] Inventors: Helmut Voltmer, Park Ridge; Alfred F. Schwenzer, Totowa; Edward J. Mazur, Montville, all of N.J.

[73] Assignee: New Jersey Machine Inc., Fairfield, N.J.

[21] Appl. No.: 101,643

[22] Filed: Sep. 28, 1987

Related U.S. Patent Documents

Reissue of:

[64] Patent No.: 4,555,299
Issued: Nov. 26, 1985
Appl. No.: 628,761
Filed: Jul. 9, 1984

U.S. Applications:

[63] Continuation-in-part of Ser. No. 542,731, Oct. 17, 1983, Pat. No. 4,502,910.

[51] Int. Cl.[5] ..... B65C 6/40

[52] U.S. Cl. ..... 156/552; 156/361; 156/566; 156/571

[58] Field of Search ..... 156/361-363, 156/584, 542, 247-249, 520, 238, 552, 564, 562, 571-572

[56] References Cited

U.S. PATENT DOCUMENTS 1,779,425 10/1930 Feybusch ..... 156/572
3,145,514 8/1964 Steffey ..... 156/247 X
3,415,705 12/1968 Ettre ..... 156/540
3,729,362 4/1973 French et al. ..... 156/584 X

*Primary Examiner*—David A. Simmons
*Attorney, Agent, or Firm*—Charles E. Baxley

[57] ABSTRACT

A system for the dispensing of literature to objects, such as containers carried by a conveyor, includes a tape for the application of adhesive to literature, and a device for the separation of the literature from the tape to permit the securing of the literature, adhesively, to the containers. A device mechanism is provided for advancing the tape through successive increments of distance, each incremental distance being equal to the size of one piece of literature. A hopper dispenses the literature to the tape, one piece at a time. Application of the pieces of literature to the objects is accomplished by a roller or brush. The literature separation device includes a bar having an edge about which the tape is bent to free the literature from the tape as the tape advances around the edge. The adhesive is retained by the literature during the separation from the tape so as to permit the adhesive attachment of the pieces of literature to the containers. The pieces of literature may be lifted from the hopper by passing an adhesive coating of the tape past an exit port of the hopper, or by use of a suction cup carried by a swing-arm assembly wherein both the movement thereof and vacuum of the suction cup are synchronized with movement of the tape.

11 Claims, 6 Drawing Sheets

LITERATURE APPLYING MECHANISM

Matter enclosed in heavy brackets [ ] appears in the original patent but forms no part of this reissue specification; matter printed in italics indicates the additions made by reissue.

RELATED APPLICATION

This patent application is a continuation-in-part of original application Ser. No. 542,731 filed Oct. 17, 1983, now U.S. Pat. No. 4,502,910, issued Mar. 5, 1985.

BACKGROUND OF THE INVENTION

This invention relates to packaging equipment, and, more particularly, to a mechanism for applying labels to containers such as bottles and boxes.

Packaging equipment is commonly in use for the filling of containers, the closure of the containers, and the labeling of containers. Examples of containers in frequent use are the bottles and boxes found on the shelves in the marketplace utilized in the packaging of food and other items utilized both in the home and in industry. Such packages are provided with labels to identify the contents of the package, as well as to provide instructions in the use of the material contained within the package.

A problem arises in that there are occasions wherein there is in sufficient room on a package label to provide all of the necesary data and instructions on the use of the material contained within the package. For example, in the distribution of medicinal products, literature in the nature of a multi-folded paper is attached desirably to the package, such multi-folded paper having adequate space to fully describe the material being packaged. However, the securing of literature, such as the foregoing multi-folded paper or a brochure of bound sheets of paper, is not applied readily by the type of mechanism utilized for applying a simple label. The bulkiness of the literature, and its tendency to open, necessitates the use of specifically constructed equipment which can handle the folded or bound literature. Thus, the foregoing problem is manifested by an inadequacy of labeling equipment to affix folded and bound literature to a container, particularly a bottle used for the storage of medicine or food.

SUMMARY OF THE INVENTION

The foregoing problem is overcome and other advantages are provided by a literature-applying mechanism which is constructed in accordance with the invention to provide a tape having an adhesive thereon for the transporting of the literature from a hopper to the site of application of the literature to the container. In a first embodiment of the invention, the hopper includes a gate for metering out of the literature, one piece at a time; and photoelectric sensors detect the presence of the literature and the presence of the container to insure that the arrival of the literature is synchronized with the arrival of the container at the site wherein the literature is secured to the container. In a second embodiment of the invention, packets of literature are extracted from a hopper by means of a suction cup carried on a rotatable arm from the hopper to the tape; and a vacuum switch detects the presence of the literature.

At the site of application of the literature to the container, the tape is driven in a sharp bend around the edge of a peel plate which dislodges the literature from the tape; the adhesive has a greater affinity for the literature than the tape, and hence is separated from the carrying tape and stays with the literature so as to permit the literature to be urged against the side of the container by a pressure roll or brush.

BRIEF DESCRIPTION OF THE DRAWINGS

The foregoing aspects and other features of the invention are explained in the following description, taken in connection with the accompanying drawing wherein.

DETAILED DESCRIPTION

Figure 1:
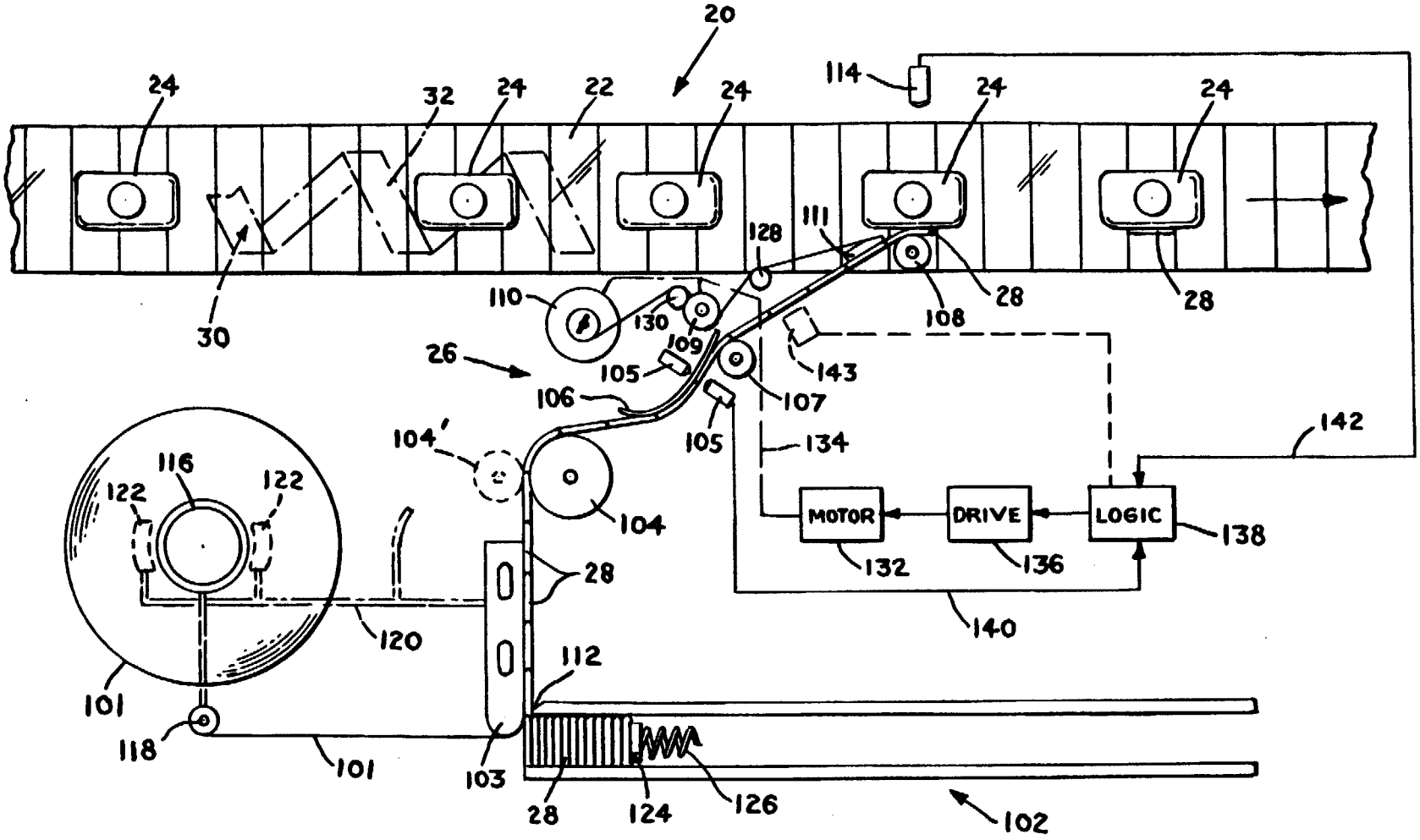
FIG. 1 shows diagrammatically a mechanism incorporating a first embodiment of the invention for applying literature to containers moving along a conveyor.

With reference to the drawing, FIG. 1 depicts a first embodiment of the invention. There is shown a system 20 comprising a conveyor 22 which carries objects such as bottles 24 past a mechanism 26. In accordance with the invention, the mechanism 26 applies literature 28 to the sides of the bottles 24. By way of example in implementing the invention, a screw 30, shown in phantom, may be incorporated in the system 20 for guiding the bottles 24. The screw 30 has threads 32 which are spaced apart by a distance equal to a diagonal of a bottle 24 so as to more accurately position the bottles 24 as they sequentially pass by the mechanism 26 along the conveyor 22. The system is an "on-demand" system; thus a delivery system other than the feedscrew may be incorporated with the invention. It is understood that the bottles 24 are shown by way of example, and that other products of round and rectangular shape may be carried by the conveyor 22 for receiving literature 28.

The mechanism 26 employs a roll of adhesive transfer tape 101, and a hopper 102 which holds the literature. A pickup bar 103 guides the tape 101 past an opening of the hopper 102 to permit the adhesive layer on the tape 101 to engage with a piece of literature 28 in the hopper 102. The tape 101 then passes by a pair of rolls 104, 104' which force the literature 28 against the tape 101 to further secure the successive pieces of literature 28 to the tape 101.

The mechanism 26 further comprises an electric eye or sensor 105 for registering the presence of the literature, a reverse-arc plate 106, an idler roll 107, an applying roll 108, a draw roll 109, a drum 110 for receiving the backing paper of the tape 101, a peel plate 111 for releasing the pieces of literature 28 from the tape 101, at adjustable gate 112 on the opening of the hopper 102, and a sensor 114 for sensing a product such as bottle 24 on the conveyor 22. Also included in the mechanism 26 are a drum 116 upon which the tape 101 is initially wound, an idler 118 for guiding the tape from the drum 116 to the pick-up bar 103, and a frame 120 which is partially shown in phantom view, and mechanically connects and positions the drum 116, the idler 118, the pick-up bar 103, as well as other idlers and rolls of the mechanism 26.

The frame 120 also holds brake pads 122 against the drum 116 to provide a braking force during paying out of the tape 101 from the drum 116. In the hopper 102, a plunger 124 is driven by a spring 126 or a constant force spring motor (not shown) to force the piece of literature 28 towards the pick-up bar 103. An idler 128 is provided for guiding the tape 101 about the draw roll 109, and a pressure roll 130 forces the tape 101 against the draw roll. A motor 132 is mechanically connected to the draw roll 109 and to the drum 110, as indicated by a dashed line 134, and imparts rotation to the draw roll 109 and the drum 110 for advancing the tape 101 and for receiving a roll of the spent tape on the drum 110. An electronic drive circuit 136, of well-known design, provides electric signals for activating the motor 132 in response to signals of a logic unit 138 coupled to the drive unit 136.

The logic unit 138 is activated by signals along lines 140 and 142, respectively, from the literature sensor 105 and the product sensor 114. A signal from the product sensor 114 indicates that a bottle 24 has advanced to a position for receiving a piece of literature 28. A subsequent signal from the literature sensor 105 indicates that the tape 101 has advanced a sufficient amount for the completion of the application of the piece of literature 28 to the bottle 24. The logic unit 138 is responsive to the signals from the product sensor 114 and the literature sensor 105 to initiate the operation of the mechanism 26 for advancement of the tape 101 when the bottle 24 arrives in position, and to stop the operation of the mechanism 26 to terminate the advancement of the tape 101 when the piece of literature 28 is fully secured to the bottle 24.

In operation, the adhesive transfer tape 101 is provided in varying widths, the width being selected in accordance with the width of the literature which is to be dispensed by the mechanism 26. The requisite width of the tape is also determined by the desired height of the location of the literature on the bottles 24.

A roll of the tape 101 is placed on the drum 116 from which it may be unwound upon demand for a piece of literature 28 to be applied to a bottle 24. As the tape 101 is unwound, a tacky adhesive is exposed on the surface of the tape. The unwound tape 101 passes along the idler 118 which guides it to the hopper 102 and the pick-up bar 103. The bar 103 insures a constant pressure of the tape 101 against the pressure of the spring 126 or constant force spring motor (not shown) and the plunger 124 which urge the pieces of literature 28 toward the tape 101 and the bar 103.

As the tape 101 moves forward, the tackiness of the adhesive will move the literature out of the hopper 102. The literature gate 112 is adjustable to insure that one piece of literature moves out of the hopper 102 with each advance of the tape 101. The pick-up bar 103 is also adjustable relative to the frame 120, as by adjustment screws (not shown), to be accurately positioned adjacent the opening of the hopper 102; this insures that a desired amount of adhesive contacts the pieces of literature 28 to successively draw them out of the hopper 102.

With each advance of the tape 101, a further piece of literature 28 is drawn out of the hopper 102 and is mounted to the tape 101. The mounting of the pieces of literature 28 to the tape 101 proceeds sequentially with each advancement of the tape 101. Thus, there develops a chain of pieces of literature 28 which is driven past the adhesive bonding rolls 104, 104' which further presses the pieces of literature 28 against the backing paper of the tape 101 to insure complete adhesive coverage on the pieces of the literature 28. It is noted, that the adhesive will remain on the pieces of literature 18 after they are extracted from the tape 101 at the peel plate 111, this adhesive remaining on the literature 28 to be utilized in securing the literature 28 to the bottles 24. The chain of literature then passes the plate 106 which is provided with a reverse arc so as to create a space between the successive pieces of literature 28, such spacing permitting beams of light from the photoelectric sensor 105 to register each advance of the tape 101 and the literature thereon.

An alternate register system, shown in phantom, employs a reflective scanner 143 activated by a printed register mark on the literature 28 to terminate the forward motion of the tape 101 carrying the literature 28. This alternative scanning register system eliminates the need for the plate 106 and the photoelectric sensor 105.

The chain of literature then advances past the idler roll 107 which guides the literature outward in the direction of the peel plate 111. The tape 101 is guided around the end of the plate 111 by the idler 128 to the draw roll 109. Rotation of the draw roll 109 by the motor 132 pulls the tape 101 around the end of the plate 111 to peel a piece of literature 28 away from the tape 101 for advancement directly ahead into the space between the roll 108 and the bottle 24 to which the literature 28 is to be applied. Overhead clamping action is provided, preferably, by an overhead clamping belt of known construction, particularly in the use of light containers. The adhesive on the literature remains with the literature as it separates from the backing paper of the tape 101 so as to stick to the side of the bottle 24. Thereby, as the bottle 24 advances along the conveyor 22 past the roll 108, the roll 108 rotates to apply the literature 28 to the bottle 24. The spent tape 101, freed of the literature 28, then continues to advance on the back side of the peel plate 111 by the idler 128 and onto the draw roll 109. Rotation of the drum 110 along with the rotation of the roll 109 further advances the spent tape 101 past the pressure roll 130 to be wound up as selvedge on the drum 110.

Synchronization of the motion of the bottles 24 with the motion of the pieces of literature 28 is accomplished with the aid of the product sensor 114, the literature sensor 105, the logic unit 138, the drive unit 136, and the motor 132. As a bottle 24 is carried along the conveyor 22 to applying roll 108, the product sensor 114 applies a signal via the logic unit 138 to the drive unit 136 to initiate operation of the motor 132. Thereby, the tape 101 begins to advance and a piece of literature 28 begins to separate from the tape 101 at the peel plate 111 to be applied by the roll 108 to the side of the bottle 24. The application of the piece of literature 28 to the bottle 24 continues until the literature sensor 105 applies a signal via the logic unit 138 and the drive unit 136 to terminate operation of the motor 132. The literature sensor 105 is so positioned relative to the chain of literature 28 at the plate 106 to signal the requisite amount of advancement of the tape 101 and the chain of literature 28 to indicate that the chain has moved forward by a spacing of one piece of literature 28. Thus, the signal of the literature sensor 105 one the line 140 designates the completion of the application of a piece of literature 28 to the side of the bottle 24. With respect to the construction of the circuitry of the logic unit 138, such circuitry may comprise a set-reset flip-flop (not shown) which is set by the signal on line 142 and reset by the signal on line 140 so as to provide a logic-1 signal to activate the drive unit 136. Alternatively, the logic unit 138 might comprise a latching relay (not shown) wherein the signal on line 142 latches the relay while the signal on line 140 restores the relay to its initial state. The motor 132 may be a well known DC (direct current) motor or stepping motor with the circuitry of the drive unit 136 being of a corresponding well-known form for driving the motor 132.

The preceding description has set forth an explanation of the structure and operation of the first embodiment of the invention. A second embodiment is presented now with reference to FIGS. 2–6. In the second embodiment, the extraction of pieces of literature or packets from the hopper is accomplished more reliably by use of a suction cup carried by a rotatable arm. A vaccum valve initiates and terminates suction at the required times for lifting the literature packets from the hopper and for depositing the packet on the adhesively coated tape. The presence of literature is monitored by a vacuum sensing switch. Spring loading is employed in the operation of the selvedge roll. The details of this second embodiment will now be presented.

With reference to FIGS. 2–6, there is shown a system 20 comprising a conveyor 22 which carries objects such as bottles 24 past a literature-applying mechanism 26. In accordance with the invention, the mechanism 26 applies literature 28 in the form of packets, to the sides of bottles 24. By way of example, in the implementation of the invention, a timing screw 30 may be incorporated in the system 20 for separating and guiding the bottles 24. The timing screw 30 has threads 32 which are spaced apart with spacing determined by the physical sizes of the bottles 24 and other considerations of the system 20, such as an oscillating pressure station (not shown) or an imprinter in a primary labeling system (not shown). The screw 30 accurately positions the bottles 24 as they pass sequentially by the mechanism 26 along the conveyor 22. The system is on "on-demand" system. Thus, a delivery system other than the timing screw may be incorporated within the system 20. It is understood that the bottles 24 are shown by way of example, and the other products of round or rectangular shape may be carried by the conveyor 22 for receiving literature 28.

The mechanism 26 employs a roll of adhesive transfer tape 101 supported on a supply roll drum 116 mounted on a table top 27 of the mechanism 26. Brake support arms 121 are pivotally mounted on the tabletop 27 and carry brake pads 122 which engage the supply roll drum 116. An adjustable spring assembly 123 biases the brake pads 122 against the drum 116 and thereby provide a braking force during a paying out of the tape 101 from the drum 116. The adhesive transfer tape 101 is routed along the path via an idler 118, as known as a dancer roll. The tape 101 is further routed via an adhesive bonding roll 104, and idler roll 107, a peel plate 111, an idler roll 128, guide rolls 127, a draw roll 109, and its associated pressure roll 130. The path of the tape 101 terminates at a selvedge roll 110 upon which is wound the depleted adhesive backing paper 131 of the tape 101. The depleted backing paper 131 remains after removal of the packets of literature 28 and the adhesive coating from the original tape 101 at the peel plate 111.

The depleted backing paper 131 is securely held between the draw roll 109 and its associated pressure roll 130, as will be explained further hereinafter. The backing paper 131 is further held by a tension force extending through the entire tape 101 and 131, which force is provided by means of the dancer roll 118. The dancer roll 118 is rotatably mounted on a dancer arm 119 which is pivotally mounted about the supply roll drum 116 and spring biased against the tape 101 by a tension spring 125. The tension spring 125 urges the dancer arm 119 toward a stop block 129. As the tape 101 and 131 is drawn forward by the draw roll 109 and the pressure roll 130 against the retarding braking force of the supply drum 116, the dancer arm 119 is pulled away from the stop block 129 against the tension of the spring 125, and thereby tensions the entire tape 101 and 131. During operation of the system 20, the retarding force of the supply drum 116 is balanced against the force of the spring 125 by means of a spring assembly 123 so that the portions of the tape 101 and 131 are always under sufficient tension to prevent sagging as they advance forward by the urging of the draw roll 109 and the pressure roll 130.

The tape 101 is routed through the mechanism 26 with the adhesive bearing surface of the tape 101 being disposed opposite the surface of the tape 101 which contacts the dancer roll 118. Thereby, the adhesive surface is oriented adjacent to a mouthpiece 144 (an array of suction holes) of a literature pick-up device 145. The pick-up device 145 acquires literature from a hopper 102, holds onto the literature by means of suction applied at the mouthpiece 144, transports the literature from the hopper 102 to the tape 101, and then releases the literature upon the tape 101 upon a termination of the suction as will be described hereinafter. A back-up pad 146 is supported on a pivotally mounted lever 147 and forced into contact with the "non-sticky" surface of the tape 101 by a solenoid 148 which is rigidly mounted to the tabletop 127 by a bracket 149.

The mouthpiece 144 is carried by an arm 150 which is slotted in an end thereof opposite the end which carries the mouthpiece 144. By means of the slotted end, the arm 150 is slidably fastened to a rotatably mounted block 151 at the tabletop 27. An oscillating motion is provided between a literature deposit position 152 and a literature pick-up position 153 (as is indicated by phantom lines in FIG. 2) adjacent to the hopper 102. The oscillating motion is imparted to the slotted arm 150 by a pivotally mounted lever 154 which, in turn, is driven by a connecting link 155 from a crank arm 156. A crank pin 157 (FIG. 3) of the arm 156 imparts the drive motion to the connecting link 155. The drive mechanism of the literature pick-up device 145 with an associated vacuum timing valve 160 and other timing functions will be explained hereinafter.

Figure 3:
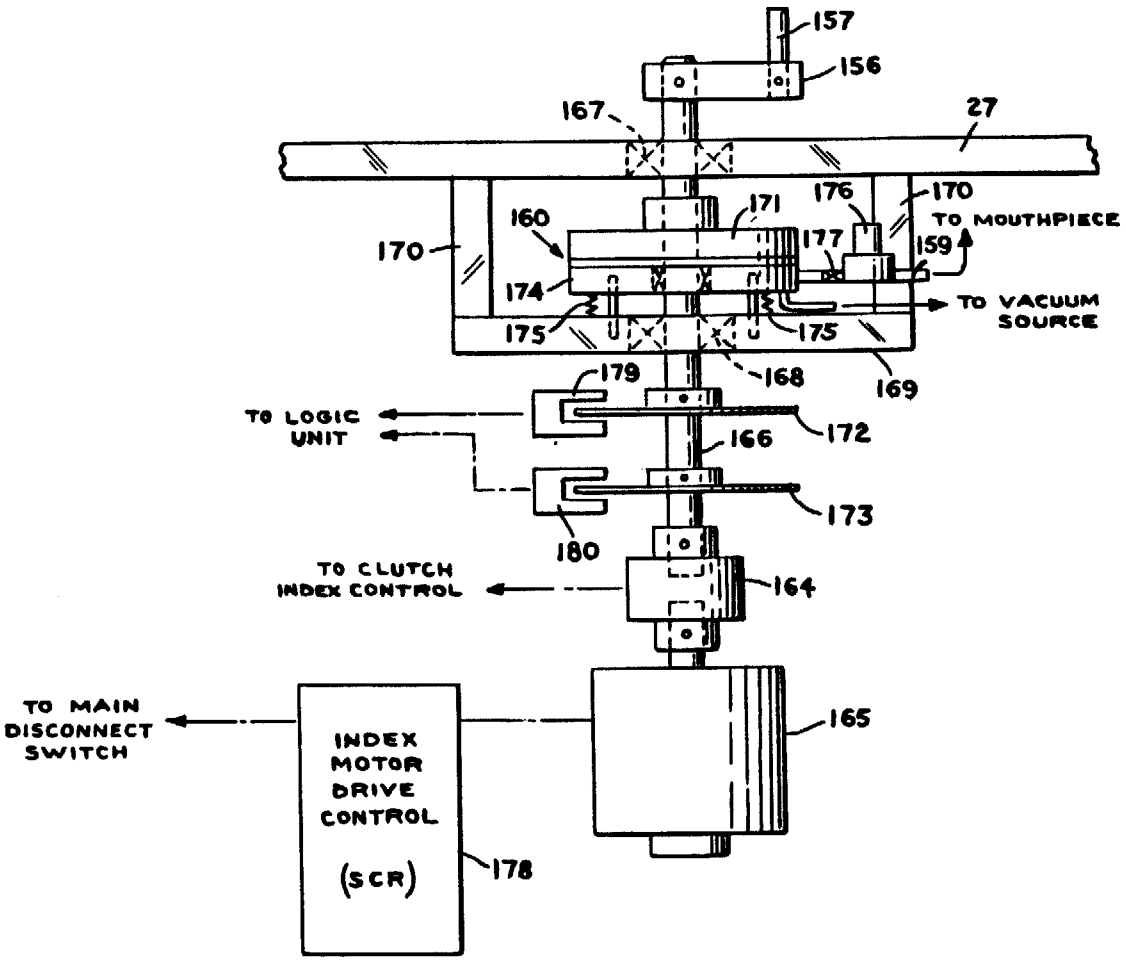
FIG. 3 shows a detailed view of the extracting mechanism drive with a vacuum timing mechanism of the embodiment of FIG. 2.
Figure 4:
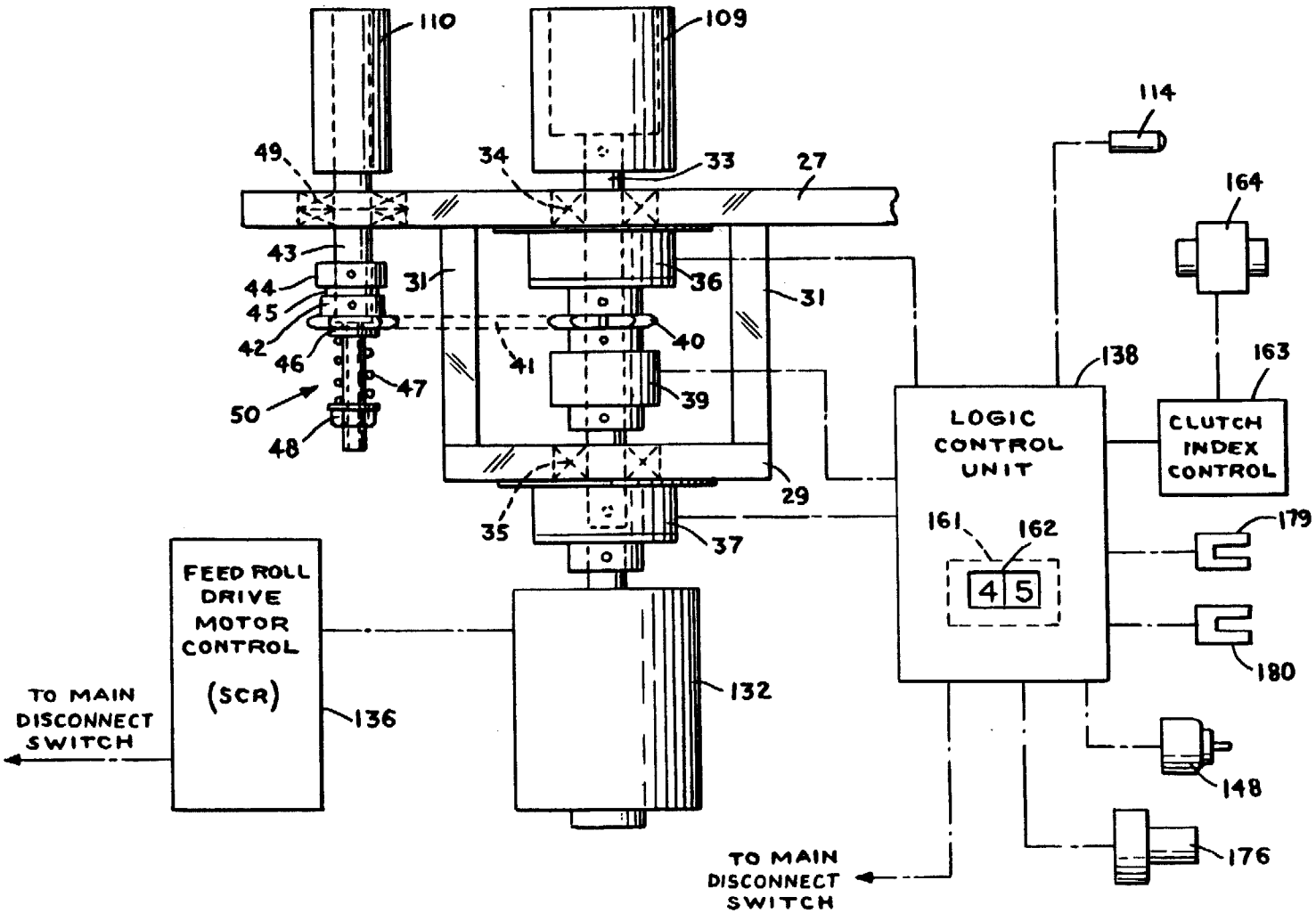
FIG. 4 shows a detailed view of the feed-roll drive mechanism and a diagrammatic representation of the applying mechanism control system of FIG. 2.

The mouthpiece 144 has a vertical front surface on which is carried two or more suction cups 158 which are connected via a flexible hose 159 to a vacuum timing valve 160 (FIG. 3). When the literature pick-up device 145 is in the literature pick-up position 153, the suction cups 158 engage the terminal packet of literature 28 in the hopper 102, and the vacuum valve 160 initiates the vacuum. Further motion of the crank arm 156 pulls the terminal packet of literature 28 from the hopper 102. The literature gate 112 is adjusted to insure that only one piece of literature is pulled from the hopper 102 by the action of the vacuum in the suction cups 158. In the hopper 102, a plunger 124 is pressed against the back side of the stack of literature 28 with a continuous force provided by a spring 126 or a constant force spring motor (not shown). Thereby, the literature 28 is urged against the literature gate 112 so as to assure a constant uninterrupted supply of literature at the gate. It is understood that, from time to time, the literature must be manually replenished in the hopper 102 before the last piece of literature from the previous batch has been acquired by the suction cups 158.

Further motion of the crank arm 156 drives the literature pick-up device 145 into the literature deposit position 152. A packet of literature 28 carried by the suction cups 158 is deposited by the device 145 onto the adhesive side of the transfer tape 101. The tape 101 is held in the position of acceptance of the literature 28 by the back-up pad 146. Sufficient force is supplied by co-operation of the pad 146 and the suction cups 158 to firmly affix the literature 28 to the tape 101. As the packet of literature 28 is brought into contact with the tape 101, the vacuum holding the literature 28 to the suction cups 158 is terminated by the vacuum valve 160, thereby to release the literature from the suction cups and to allow its adhesion to the adhesive of the tape 101.

In summary, during one cycle in the operation of the pick-up device 145, a packet of literature 28 is acquired at the hopper 102 at the position 153, the literature 28 is deposited onto the transfer tape 101 at the deposit position 152, this being followed by a return of the device 145 to the hopper 102 at the pick-up position 153. The foregoing cycle is completed during the dwell or rest period in the feed motion of the transfer tape 101. The tape 101 is stationary during the dwell period. As the transfer tape 101 passes by a bottle 24 and releases a packet of literature 28, the adhesive coating separates from the transfer tape 101 and adheres to the packet of literature 28 for securing the literature to the bottle 24. Withdrawal of the adhesive coating from the tape 101 leaves the backing paper 131 which continues on via the idler roll 128 to the drum or selvedge roll 110. The forward motion of the tape 101 is generated by the frictional force of the backing paper 131 wrapped around the circumference of the draw roll 109 with the assistance of the guide rolls 127 and the pressure roll 130. The pressure roll 130 is rotatably supported by a pivotally mounted arm 133 which is urged towards the draw roll 109 by a spring 135. The draw roll 109 is rigidly mounted on a drive shaft 33 (FIG. 4) which is rotatably supported by a bearing 34, mounted in the tabletop 27, and a bearing 35, mounted in a support plate 29.

The support plate 29 is rigidly mounted to the tabletop 27 by spacers 31. Also mounted on the tabletop 27 is a brake with its armature fastened to the drive shaft 33. The plate 29 supports a clutch 37. The clutch 37 has a rotor fastened to the drive shaft 33 and an armature fastened to a drive motor 132. Also fastened to the drive shaft 33 is a well-known, commercially manufactured shaft-angle encoder 39 which generates a set of digital pulses for each revolution of the shaft 33. By way of example in the use of the encoder 39, assuming that the encoder 39 produces a total of 400 pulses for one revolution of the shaft, and furthermore assuming the circumference of the draw roll 109 to be ten inches, then each pulse of the encoder represents an incremental rotation of 0.025 inches of the draw roll 109 and a corresponding advance of the tape 101 and backing paper 131.

The shaft 33 is coupled to a sprocket 40 which carries a chain 41 by which the sprocket 40 drives a second sprocket 42. The second sprocket 42 is mounted on a drive shaft 43 of the drum or selvedge roll 110 for rotation therewith. The sprocket 42 drives the shaft 43 through an adjustable friction drive 50 comprising a back-up collar 44, a friction washer 45, a hardened washer 46, a compression spring 47 and a compression adjustment nut 48. Use of the nut 48 in adjusting the compression of the spring 47 regulates the frictional force of the foregoing friction drive 50. The selvedge drive shaft 43 is rotatably mounted on the tabletop 27 by means of a double row ball bearing 49. The shaft 43 carries on its upper end, and rigidly mounted thereto, the roll 110.

In operation, the product sensor 114, which may be adjusted in position longitudinally along the conveyor 22, signals the logic control unit 138 that a bottle 24 moving along the conveyor 22 is in position to receive a packet of literature 28'. The signal of the sensor 114 serves as a "start" command signal for the logic control unit 138 which, in response to the start command de-energizes the draw roll brake 36 and energizes the draw roll clutch 37. The clutch 37 engages the rotating drive motor 132 to the drive shaft 33 and thereby rotates the draw roll 109 for advancing the backing paper 131 and the transfer tape 101. The tape 101 carries a series of literature packets 28 which have been placed upon the tape 101 by the aforementioned action of the literature pick-up device 145. As the series or chain of literature packets 28 fastened to the transfer tape 101 travels from the literature deposit position 152 around the adhesive bonding rolls 104–104' (the latter roll 104' may be delected if desired), further pressure is developed against the tape 101 to insure complete adhesive coverage of the packets of literature 28. It is also noted that the adhesive carried by the tape 101 has a greater affinity towards the type of paper which is commonly used for the printing of literature than for the backing paper 131 and, accordingly, leaves the tape 101 and adheres to the literature 28 as a packet of literature 28 is lifted off of the tape 101. Such separation of the literature 28 from the tape 101 occurs at the peel plate 111. The adhesive remaining on the packet of literature 28 is utilized in securing the literature 28 to the bottles 24.

After passing the bonding rolls 104–104', the series of literature packets advances past the idler roll 107 which guides the literature onward in the direction of the peel plate 111. The tape 101 is guided around the end of the plate 111 by the idler 128 and directed toward the draw roll 109. At the peel plate 111, the adhesive coating is separated from the transfer tape 101 leaving only the backing paper 131. Rotation of the draw roll 109 by the motor 132 pulls the tape 101, 131 around the end of the plate 111 to peel a packet of literature 28 away from the tape 101 for advancement directly ahead into the space between the roll 108 and the bottle 24 to which the packet of literature 28 is to be applied. An overhead clamping action is provided, preferably, by an overhead clamping belt (not shown) of known construction, particularly in the labeling of bottles and containers of light weight. The literature packet with the adhesive applied thereto by the tape 101 is pressed against the bottle 24 by the roll 108. Thereby, as the bottle 24 advances along the conveyor 22 past the roll 108, the roll 108 rotates to apply the literature to the bottle 24. The spent tape 131, freed of the literature 28 and the adhesive coating, then continues to advance on the backside of the peel plate 111 onto the idler 128 and then around the draw roll 109 under direction of the guide roll 127. Rotation of the drum 110 along with the rotation of the roll 109 further advances the spent tape 131 to be wound up on the drum or roll 110.

Synchronization of the motion of the bottles 24 with the motion of the packets of literature 28 is accomplished with the aid of the product sensor 114, the logic control unit 138, the motor control circuit 136 and the drive motor 132. As a bottle 24 is carried along the conveyor 22 to the applying roll 108, the product sensor 114 applies a signal to the logic unit 138 which, in turn, directs the clutch 36 and the brake 37 to initiate rotation of the draw roll 109. Thereby, the tape 101 advances and a packet of literature 28 separates from the tape 101 at the peel plate 111 to be applied by the roll 108 to the side of the bottle 24.

The speed of the tape 101 and the speed of the bottles 24 moving on the conveyor 22 are synchronized by adjustment of the rotational speed of the drive motor 132 by the control circuit 136. For this purpose, the motor 132 may be a well-known DC (direct current) motor, and the circuitry of the motor control circuit 136 is similarly of well-known form as is used in regulating the speed of a motor such as the motor 132.

Upon the initiation of the clutch-brake operation by the logic control unit 138, a counter 161 within the unit 138 becomes unlatched and begins counting the pulses generated by the shaft-angle encoder 39. The counter 161 counts for a preset number of counts which correspond to the desired length of advancement of the tape 101 for application of one packet of literature 28. Upon counting the predetermined number of counts, the counter 161 generates a supervisory signal which activates the logic control unit 138 to generate signals which de-energize the clutch 38 and energize the brake 37 for stopping the forward motion of the transfer tape 101. With the stopping of the tape 101, the internal circuitry of the logic control unit 138 automatically resets the counter 161 in preparation for a subsequent counting operation. (See for example, "Label Length Monitor", U.S. Pat. No. 4,397,709 issued to the assignee hereof).

Included within the logic control unit 138 is a display 162 with rotary selector switches by which a number is entered for presetting the counter 161. By way of example, one packet or piece of literature 28 has a width of 1⅛ inches as measured along the tape 101. Assuming each count represents an advance in the tape 101 of 0.025 inches, then 45 counts by the counter 161 must accrue for an advancement of the tape 101 which is equal to the foregoing width of the piece of literature. Accordingly, for the foregoing example, the counter 161 would be preset to a value of "45".

In response to the foregoing supervisory signal from the counter 161, the logic control unit 138 also generates a pulse signal of sufficient duration to cycle a clutch index control 163. The clutch index control 163 is a commercially manufactured control unit commonly referred to as a "One-Shot" control, such a control being manufactured by the Warner Electric Co. A one-revolution clutch 164 (FIGS. 3 and 4) connected electrically to the control 163, and is mechanically coupled to a drive motor 165 (FIG. 3) which drives through a shaft 166 for operation of the crank arm 156 (FIGS. 2 and 3) in the literature pick-up device 145. The clutch index control 163 activates the clutch 164 to the cycle and thereby connect the motor 165 to the shaft 166 for rotating the shaft 166 for one complete revolution.

The drive shaft 166 is rotatably mounted by a bearing 167 to the tabletop 27 and by a bearing 168 to a support plate 169, the latter being rigidly fixed by spacer blocks 170 to the tabletop 27. The crank arm 156 is fastened to the upper end of the shaft 166. The vacuum timing valve rotor 171 of a vacuum timing valve 160, and slotted discs 172–173 are also fastened to the shaft 166. The stator 174 of the timing valve 160 is supported in stationary fashion by the support plate 169, and is urged into air tight contact with the rotor 171 by compression springs 175.

A vacuum sensing switch 176, such a switch being manufactured by the Barksdale Co. is inserted in the path of vacuum carried by the vacuum hose 159 between the mouthpiece 144 and the timing valve 160. An orifice 177 is also inserted in the foregoing vacuum path between the vacuum sensing switch 176 and a port of the stator 174 of the vacuum timing valve 160. A second port of the stator 174 is connected to a known source of vacuum (not shown). The area of the opening in the orifice 177 is smaller than the combined area of the vacuum ports of the mouthpiece 144 carrying the suction cups 158. Thus, any blockage of the vacuum ports by a piece of literature 28 will create a relatively high level of vacuum in the vacuum switch 176, and thereby close an associated electrical contact of the switch 176. Alternatively, in the absence of a piece of literature 28 on the mouthpiece 144, the suction holes thereof open to the atmosphere, and thereby reduce the level of vacuum sensed by the switch 176 to open the associated electrical contact.

The cycling speed of the literature pick-up device 145 is synchronized with the cycling speed of the transfer taper 101. The literature transfer from the literature pick-up position 153 to the literature deposit position 152 occurs while the transfer tape 101 is at rest. This period of time occurs between the "stop" signal from the logic control unit 138 as generated by the counter 161, and the "start" signal from the logic control unit 138 as initiated by the product sensor 114. Thus, the duration of the rest cycle of the tape 101 depends on the spacing between the bottles 24 on the conveyor 22, and also on the linear velocity of the bottles 24 on the conveyor 22. The speed of the conveyor 22 is synchronized with the speed of the tape 101 as described hereinabove. The rotational speed of the drive shaft 166 and its attached crank arm 156 are variable in order to allow sufficient time to accomplish the transfer of the literature 28 without exceeding the required time window for transfer of the literature from the hopper 102 to the tape 101. The provision of adequate time for the foregoing transfer inhibits any development of unwanted stresses on the literature pick-up device 145. The foregoing timing parameters are readily met by employing a commercially available, well-known DC motor for the motor 165 along with a well-known motor controller 178 for regulating the speed of the motor 165.

Figure 2:
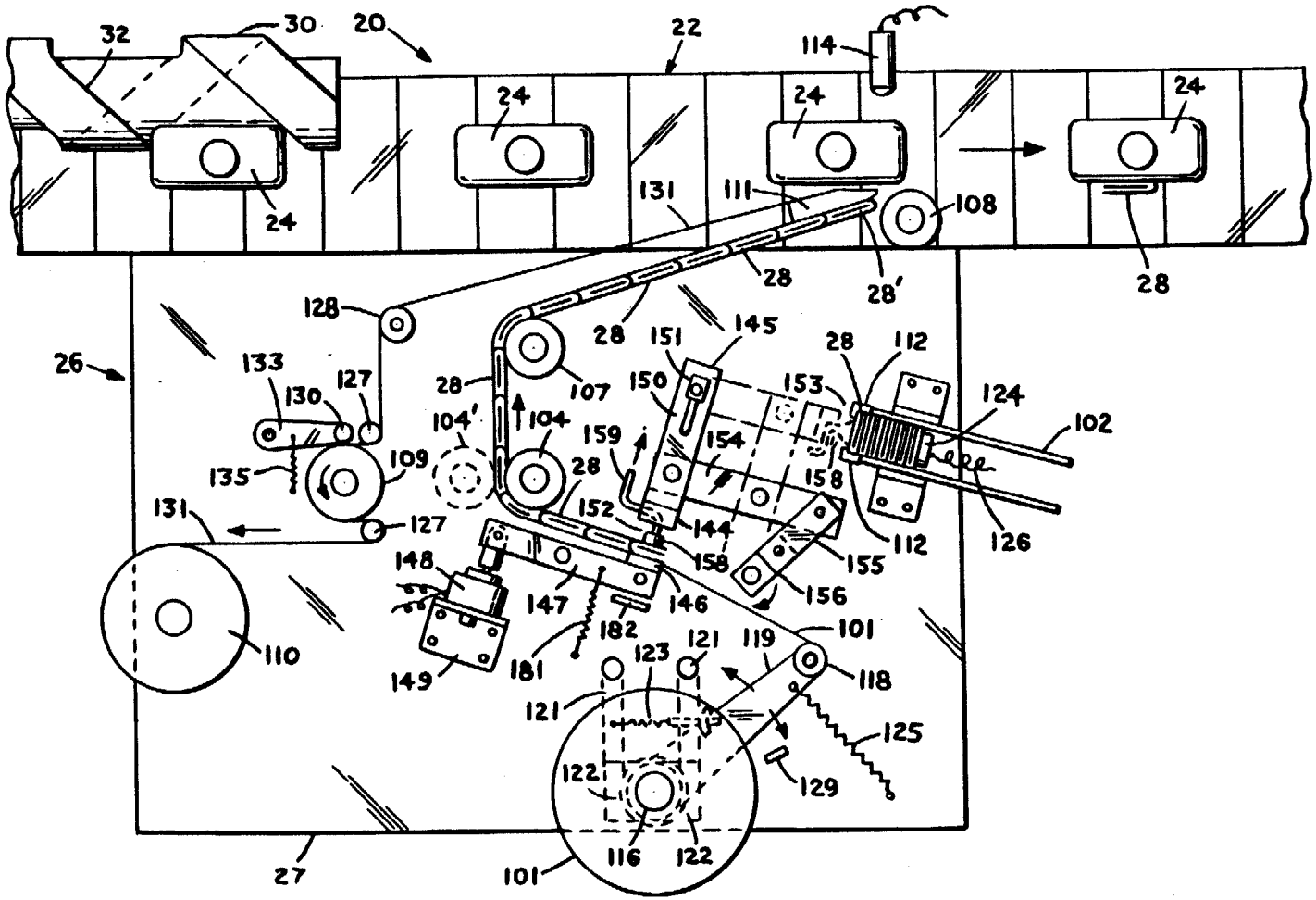
FIG. 2 is a plan view of a mechanism incorporating a second embodiment of the invention for applying literature to containers moving along a conveyor, the view showing an adhesive transfer tape supply roll, a device for extracting literature from a hopper, and the separation of the literature from the tape for application to the containers.

In view of the foregoing description, under normal operating conditions of the system 20 of FIG. 2, the literature applying mechanism 26 is responsive to the presence of a bottle 24 on the conveyor 22 to initiate the feeding of the transfer tape 101 carrying literature 28 in the arrangement of continuous chain from the literature deposit position 152 to the peel plate 111. At the peel plate 111, a packet of literature is separated from the tape 101 to be affixed to the bottle 24. The chain of literature should be continuous to prevent malfunctioning of the system. To insure such continuity, the following interlock system is advantageously employed.

Figure 5:
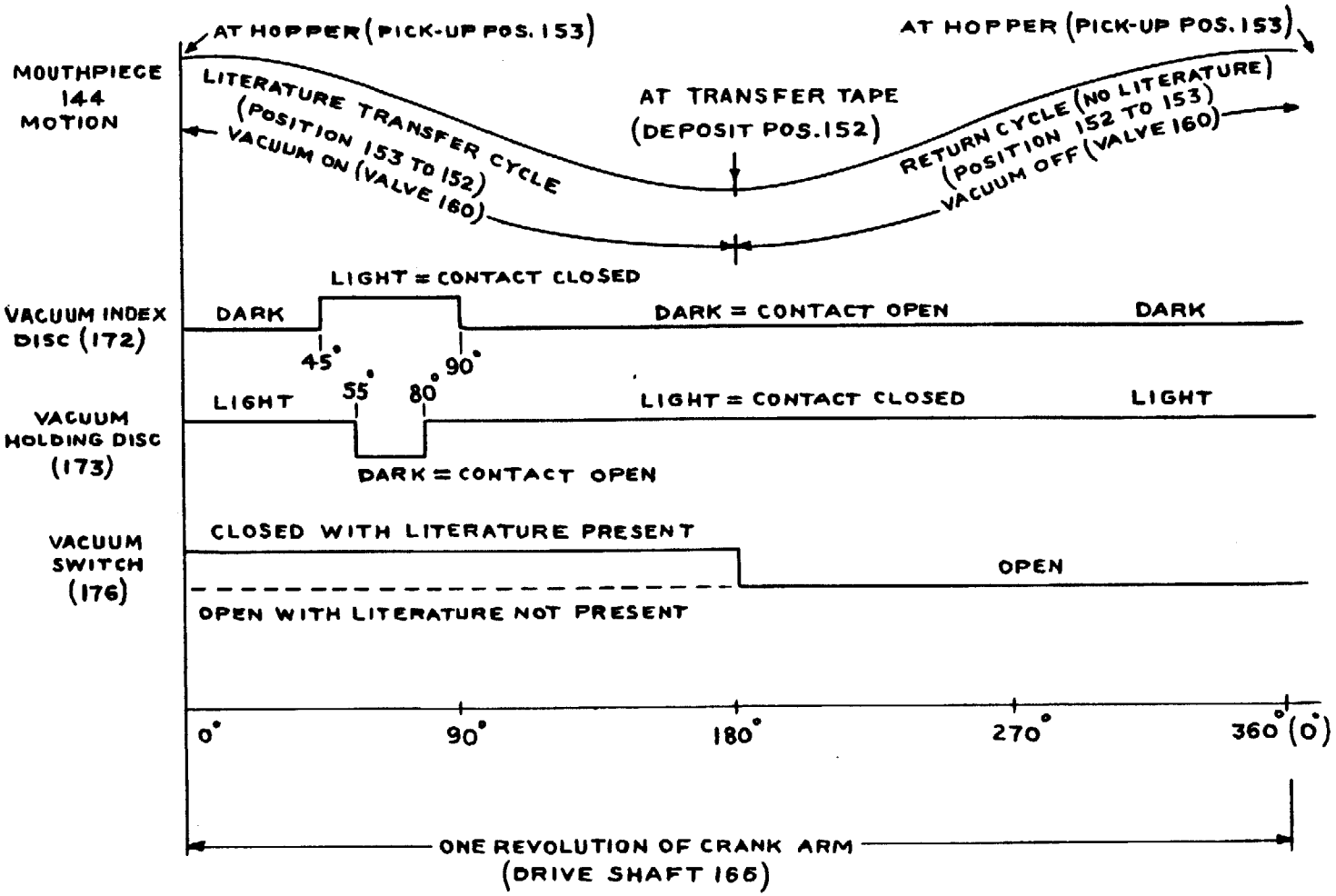
FIG. 5 is a timing diagram for one revolution of the drive shaft of a literature pick-up device explaining the interaction of literature with the literature detecting system of FIG. 2.
Figure 6:
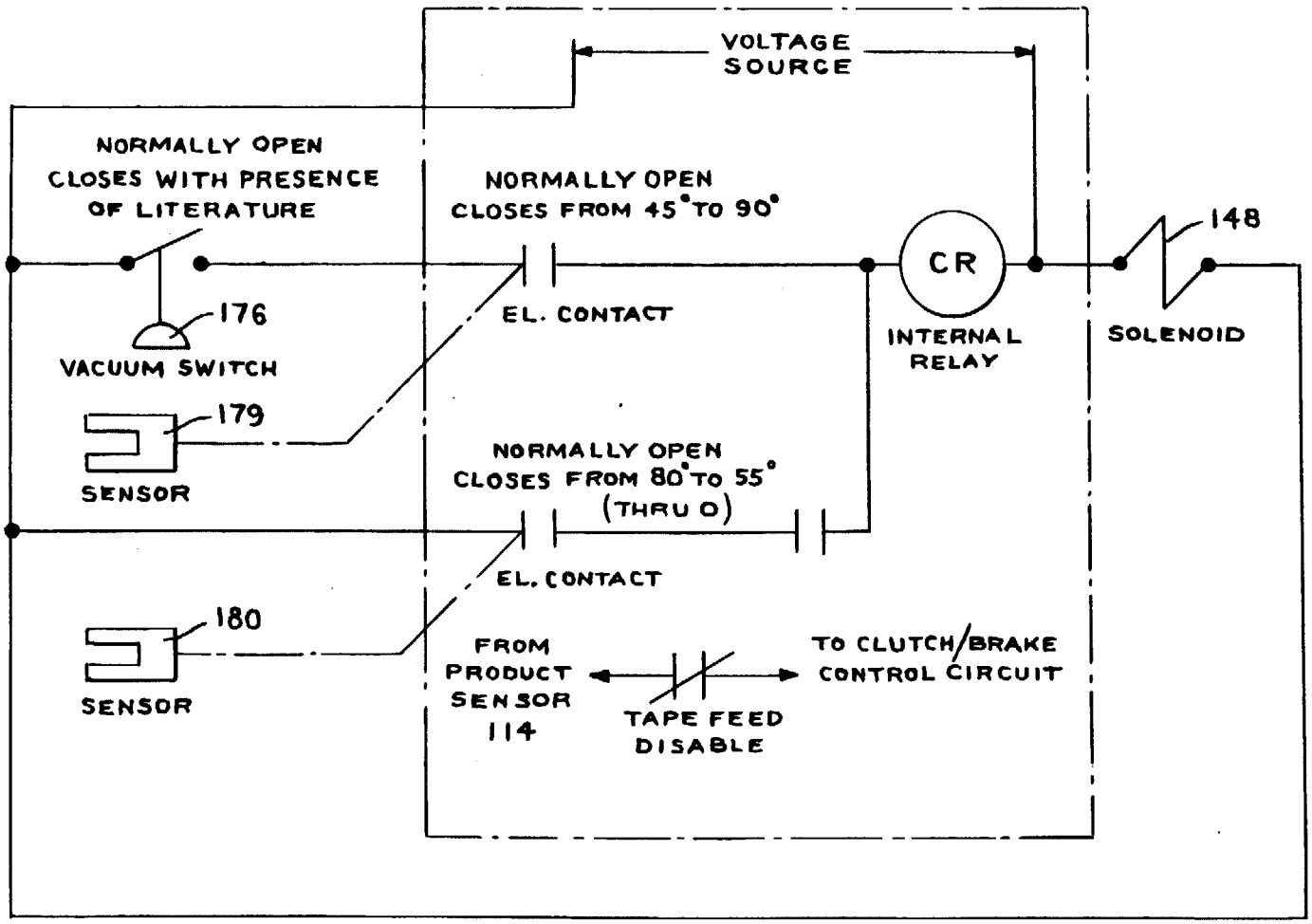
FIG. 6 is a schematic representation of an electrical contact in a circuit for the literature detecting system.

With reference to FIG. 5, it is noted that the vacuum from the known source is connected to the mouthpiece 144 through the action of the vacuum timing valve 160 during a transfer cycle from 0° to 180° of revolution of the drive shaft 166. The vacuum has been disconnected during the return cycle from 180° to 360° of revolution of the crank arm 156. A photoelectric sensor 179 is positioned alongside the slotted disc 172 which is carried by the drive shaft 166. The slotted disc 172 allows light to reach the sensor 179 from 45° to 90° of revolution of the drive shaft 166. During the foregoing illumination of the sensor 179 by the light, the sensor 179 effects a closure of an electrical contact in the logic control unit 138. The schematic representation of the electrical contact interaction is shown in FIG. 6.

The foregoing contact closure signifies, in conjunction with the presence of a high level of vacuum as detected by the vacuum switch 176, that a piece of literature has been withdrawn from the hopper 102 and is in the process of being transferred to the literature deposit position 152. This combination of events results in the energization of the solenoid 148 (FIG. 2) by means of the circuit of FIG. 6, the energized solenoid 148 acting through the lever 147 to advance the back-up pad 146 against the force of the spring 181. The advancement of the pad 146 places the pad 146 into a position alongside the tape 101 wherein the pad 146 provides a solid restraining surface for holding the tape 101 against the force of the literature 28 as it is deposited upon the tape 101 in the position 152. The operation of the solenoid 148 is inhibited from a continuous cycling in each return cycle of 180° to 360° (FIG. 5) when the vacuum is terminated at the mouthpiece 144 to release the literature 28 to the transfer tape 101. The inhibiting of the continuous cycling is attained by virtue of the operation of the slotted disc 173 with its associated photoelectric sensor 180 and a second electrical contact closure in the logic control unit 138 which provides a holding signal to retain the solenoid 148 in an energized state to retain the pad 146 in the accepting position. The electrical circuitry connecting the sensor 180 to the solenoid 148 is shown in FIG. 6.

In the event of a failure to pick up literature 28 at the hopper 102 by the mouthpiece 144, the contacts of the vacuum switch 176 open. When the slotted disc 173 reaches the 55° position of the transfer cycle (FIG. 5), the holding contacts open and de-energize the solenoid 148, thereby enabling the spring 181 (FIG. 2) to retract the pad 146 against the stop block 182. The retraction of the pad 146 displaces the transfer tape 101 sideways away from the accepting position. The displacement of the tape 101 prevents the transfer of adhesive from the tape 101 onto the suction cups 158 of the mouthpiece 144. It is noted that the presence of such adhesive on the suction cups 158 would be detrimental to the operation of the system, because it would prevent the transfer of a piece of the literature to the tape 101 during a subsequent operating cycle.

The absence of literature 28 on the mouthpiece 144 during the sensing portion of the transfer cycle will also cause the logic control unit 138 to generate a "disable" signal to prevent the forward motion of the transfer tape 101, thereby insuring that the chain of literature remains uninterrupted on the transfer tape 101.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

We claim:

1. A system for applying literature to the sidewall of an object comprising:

means for pressing the literature against said sidewall: [hopper] means for storing the literature;

a tape having an adhesive coating for carrying pieces of the literature from said [hopper] *storing* means to said pressing means;

means for moving said tape to said pressing means repetitively such that there are time intervals of advancement of the tape alternating with rest intervals during which said tape is stationary;

vacuum operated transporting means for transferring a piece of the literature from said [hopper] *storing* means to said tape during one of said rest intervals, said transporting means including suction cup means for engaging with a piece of the literature upon initiation of a vacuum, and for releasing the piece of literature upon termination of the vacuum;

vacuum means coupled to said suction cup means for applying a vacuum thereto and for terminating such vacuum;

a swing-arm assembly for carrying said suction cup means from said [hopper] *storing* means to the adhesive coating on said tape so as to permit engagement of said piece of literature with the adhesive coating;

a crank drive rotatably driven and connecting with said swing-arm assembly to impart motion thereto for transferring the literature; and a vacuum valve driven by a shaft of said crank drive in synchronism with the operation of said swing-arm assembly, said vacuum valve initiating the vacuum and suction of the suction cup means at one position of said swing-arm assembly, said vacuum valve terminating the vacuum and the suction of the suction cup means at a second position of the swing-arm assembly; and said system further comprising a pad disposed adjacent said second position of said suction cup means and on the opposite side of said tape from said suction cup means in said second position;

means for positioning said pad at the backside of said tape, said positioning means advancing said pad to said tape for restraining a transverse movement of said tape in response to pressure of said literature associated with the emplacement of said literature upon said adhesive coating by said transporting means, said positioning means retracting said pad from said tape upon a withdrawal of said suction cup means for said tape, thereby inhibiting any contact of said suction cup means with said adhesive coating; and means for synchronizing the operation of said positioning means with movement of said crank drive, thereby to co-ordinate the positioning of said pad with the operation of said transporting means.

2. A system according to claim 1 further comprising means for guiding said object past said pressing means, and wherein said tape moving means comprising:

means for sensing the position of said object; and means responsive to signals of said sensing means for activating said moving means during one of said advancement intervals.

3. A system according to claim 2 wherein said moving means comprises:

means for unwinding fresh tape;

means for winding up spent tape;

a brake applied to said unwinding means; and a clutch operated drive for rotating said winding up means.

4. A system according to claim 1 wherein said moving means comprises:

a bar with an edge;

means for directing the tape around said edge for separating a piece of literature from the tape; and wherein said pressing means is located adjacent said bar for receiving said literature in a space between said object and said pressing means.

5. A system according to claim 4 wherein said synchronization means synchronizes operation of said moving means with operation of said crank drive to accomplish the transferring of the piece of literature from said [hopper] *storing means* to the tape during a rest interval.

6. A system according to claim 5 further comprising means for guiding said object past said pressing means, and wherein said tape moving means comprises:

means for sensing the position of said object; and means responsive to signals of said sensing means for activating said moving means during one of said advancement intervals.

7. A system according to claim 6 wherein said moving means comprises:

means for unwinding fresh tape;

means for winding up spent tape;

a brake applied to said unwinding means;

and a clutch operating drive for rotating said winding up means.

8. A system for applying a piece of literature to an object, said system comprising:

means for pressing the piece of literature against the object;

[a hopper] *means* for storing pieces of literature;

means for moving a tape having an adhesive coating to said pressing means;

suction cup means movable between a first position in which said suction cup means picks up, by a vacuum, the piece of literature from said [hopper] *storing means* and a second position in which said suction cup means delivers said piece of literature onto said adhesive coating of said tape and said vacuum is terminated; and means disposed adjacent said second position for urging said tape toward said suction cup means and against said piece of literature as said suction cup means deliver said piece of literature onto said adhesive coating of said tape.

9. A system according to claim 8 wherein said urging means is movable toward said suction cup means when the latter is in said second position.

10. A system according to claim 9 wherein said urging means is a pad.

*11. A system according to claim 8 wherein the adhesive coating is on one side only of the tape and said means for urging the tape against the literature presses said one side of said tape against the literature.*

* * * * *